(12) United States Patent
Patil et al.

(10) Patent No.: US 10,187,328 B2
(45) Date of Patent: *Jan. 22, 2019

(54) ANOMALY DETECTION AND CLASSIFICATION USING TELEMETRY DATA

(71) Applicant: Microsoft Technology Licensing, LLC, Redmond, WA (US)

(72) Inventors: Nagaraj Patil, Redmond, WA (US); Kiran Nallabothula, Redmond, WA (US); Christopher Barnes, Woodinville, WA (US); Nagaraju Palla, Bothell, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/958,293

(22) Filed: Apr. 20, 2018

(65) Prior Publication Data

US 2018/0241693 A1    Aug. 23, 2018

Related U.S. Application Data

(63) Continuation of application No. 15/055,251, filed on Feb. 26, 2016, now Pat. No. 9,979,675.

(51) Int. Cl.
*H04L 12/24* (2006.01)
*H04L 12/911* (2013.01)
*H04L 29/12* (2006.01)

(52) U.S. Cl.
CPC .......... *H04L 47/827* (2013.01); *H04L 41/064* (2013.01); *H04L 41/147* (2013.01); *H04L 61/1511* (2013.01)

(58) Field of Classification Search
CPC ... H04L 47/827; H04L 41/064; H04L 41/147; H04L 61/1511
See application file for complete search history.

(56) References Cited

U.S. PATENT DOCUMENTS 8,306,931 B1 * 11/2012 Bowman .............. G06N 3/0454
706/20
9,843,474 B2 * 12/2017 Estrada ............... H04L 41/0695
(Continued)

OTHER PUBLICATIONS

Cisco, "Telemetry and Anomaly Detection", http://www.ciscopress.com/articles/article.asp?p=791595&seqNum=2, published Jun. 26, 2008.*

*Primary Examiner* — Oanh Duong
(74) *Attorney, Agent, or Firm* — Michael Best & Friedrich LLP

(57) ABSTRACT

Historical telemetry data can be used to generate predictions for various classes of data at various aggregates of a system that implements an online service. An anomaly detection process can then be utilized to detect anomalies for a class of data at a selected aggregate. An example anomaly detection process includes receiving telemetry data originating from a plurality of client devices, selecting a class of data from the telemetry data, converting the class of data to a set of metrics, aggregating the set of metrics according to a component of interest to obtain values of aggregated metrics over time for the component of interest, determining a prediction error by comparing the values of the aggregated metrics to a prediction, detecting an anomaly based at least in part on the prediction error, and transmitting an alert message of the anomaly to a receiving entity.

20 Claims, 5 Drawing Sheets

(56) References Cited

U.S. PATENT DOCUMENTS

| | | | | |
|---|---|---|---|---|
| 9,979,675 | B2* | 5/2018 | Patil | H04L 47/827 |
| 2007/0294591 | A1* | 12/2007 | Usynin | G06F 1/30 |
| | | | | 714/45 |
| 2009/0274053 | A1* | 11/2009 | Thompson | G06F 11/3419 |
| | | | | 370/242 |
| 2010/0229023 | A1* | 9/2010 | Gross | G06F 11/0724 |
| | | | | 714/2 |
| 2011/0035188 | A1* | 2/2011 | Martinez-Heras | G05B 23/021 |
| | | | | 702/189 |
| 2012/0110344 | A1* | 5/2012 | Sadovsky | G06F 11/0748 |
| | | | | 713/189 |
| 2014/0153396 | A1* | 6/2014 | Gopalan | H04L 41/142 |
| | | | | 370/235 |
| 2014/0283047 | A1* | 9/2014 | Dixit | G06F 21/55 |
| | | | | 726/23 |
| 2015/0046512 | A1* | 2/2015 | Ashby | H04L 43/08 |
| | | | | 709/203 |
| 2017/0187570 | A1* | 6/2017 | Estrada | H04L 41/0695 |
| 2017/0192872 | A1* | 7/2017 | Awad | G06F 17/18 |

* cited by examiner

ANOMALY DETECTION AND CLASSIFICATION USING TELEMETRY DATA

BACKGROUND

An online service can be provided by a service provider for use by a plurality of customers (or tenants). One example of such an online service is a cloud-based electronic mail (e-mail) service that customers can use to, among other things, send and receive emails. Such an online service can be hosted on a data center comprising a plurality of geographically-distributed server clusters. When a given customer uses a client computing device to connect to the online service, the signals transmitted from the client computing device often traverse a complex route over a network topology to ultimately arrive at a destination server of the data center. For example, a signal transmitted from the client computing device can be relayed by one or multiple Internet service providers (ISPs) before reaching the destination server.

Various problems can arise at different points along the network route from the client to the server. Regardless of where they occur, these problems often manifest themselves as connection issues at the client computing device. However, sometimes these issues are caused by problems occurring at points that are outside of the service provider's domain. For example, a particular ISP's equipment might be experiencing an equipment failure, or a client-side configuration may have been improperly configured, either of which can cause the customer to experience connection issues when attempting to connect to the online service. These issues are often perceived as issues with the online service itself even though the issues actually stem from problems occurring outside of the service provider's domain.

Currently, there is no easy way for a service provider to identify problems that occur at points outside of the service provider's domain. For example, the service provider cannot actively monitor a third party ISP's equipment or a client-side configuration to determine if a problem occurs at those points along the client-server network route, and it can take an extended amount of time to identify such a problem. This, in turn, increases the recovery time to restore operation of the online service, and the reliability of the online service is compromised as a result.

SUMMARY

Described herein are techniques and systems for automatically detecting an anomaly relating to an online service using telemetry data. The telemetry data originates from client devices that are accessing an online service and can be transmitted from a client device periodically and/or in response to events or rules. The use of telemetry data for detecting an anomaly allows a service provider of the online service to infer from the detected anomaly that a problem has occurred in relation to the online service, as well as what the problem is, and/or where it has occurred. The use of telemetry data further allows the service provider to detect problems that occur outside of the service provider's domain. Thus, the anomaly detection techniques and systems disclosed herein enable end-to-end performance monitoring of the online service without having to implement local monitoring systems at every discrete point along the end-to-end network topology.

In some configurations, historical telemetry data can be used to generate predictions for various classes of data at various aggregates of the system utilized for implementing the online service. For example, a class of data can comprise a first error code found in the telemetry data, and the data pertaining to the first error code can be converted to a set of metrics (e.g., a count or rate of the first error code). The set of metrics can then be aggregated by a component of interest in the system that implements the online service. For example, the component of interest can comprise a particular ISP. In this manner, a set of metrics for a class of data (e.g., an error code) can be aggregated according to the particular ISP. Thus, a prediction can be generated for the component of interest (e.g., a particular ISP) in the form of a time series (e.g., a count of the first error code) that is to be expected under normal conditions. Additional predictions can be generated in a similar manner for additional classes of data at additional aggregates of the system to form a plurality of predictions that can be used for anomaly detection.

With a prediction generated for a class of data in a selected aggregate (i.e., a component of interest), an anomaly detection process can be utilized to detect anomalies for the class of data at the selected aggregate. A corresponding problem can be inferred from the detected anomaly and remedial measures can be initiated to resolve the problem and restore operation of the online service. An example anomaly detection process can include receiving telemetry data originating from a plurality of client devices, selecting a class of data from the telemetry data, converting the class of data to a set of metrics, aggregating the set of metrics according to a component of interest to obtain values of aggregated metrics over time for the component of interest. A prediction error can then be determined by comparing the values of the aggregated metrics to the prediction, and the prediction error can be used to detect an anomaly. An alert message of the anomaly can be transmitted as a remedial action that helps restore functional operation of the online service.

By automatically detecting an anomaly relating to an online service using telemetry data, end-to-end performance monitoring of an online service is enabled without having to implement monitoring systems locally at every discrete point of interest along the end-to-end network topology used to implement the online service. This reduces network bandwidth usage that would otherwise be required to monitor and transmit signals from many discrete monitoring points in the system. Instead, the techniques described herein leverage telemetry data that is already being transmitted by client computing devices while accessing an online service. Furthermore, the techniques and systems described herein provide a service provider of an online service with the ability to detect anomalies that occur outside of the service provider's domain. This allows a service provider to identify the out-of-domain problem and take prompt remedial action, which can decrease the time to recover from an issue that impacts the operation of the online service, thereby making the online service more reliable by minimizing downtime of the service. For instance, if there is a problem with the equipment of a third party ISP that is causing a disruption in connectivity for tenants of the online service, an anomaly pertaining to a class of data for the particular ISP can be detected, which can trigger an alert for personnel of the service provider to contact the third party ISP and to resolve the issue as quickly as possible so that service can be restored to tenants of the online service. In this regard, the techniques and systems described herein improve the functioning of the computing systems that implement the online service, and the online service itself is improved by increasing the reliability of the systems utilized for providing such services.

This Summary is provided to introduce a selection of concepts in a simplified form that is further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicates similar or identical items.

DETAILED DESCRIPTION

Configurations of the present disclosure are directed to, among other things, techniques and systems for automatically detecting an anomaly relating to an online service using telemetry data. Although many of the examples presented herein are described in terms of a cloud-based e-mail service, the configurations disclosed herein can be implemented in a number of ways and in varying applications. Particularly, the techniques and systems described herein can be applied to any type of online service or Internet hosting service that can experience issues with the operation of the service and/or issues with customers connecting to, or otherwise utilizing, the service.

By the use of the techniques disclosed herein, one or more devices can be configured to conserve resources with respect to power resources, memory resources, communications bandwidth resources, processing resources, and/or other resources while providing mechanisms for automatically detecting anomalies relating to an online service using telemetry data. Technical effects other than those mentioned herein can also be realized from an implementation of the technologies disclosed herein.

Figure 1:
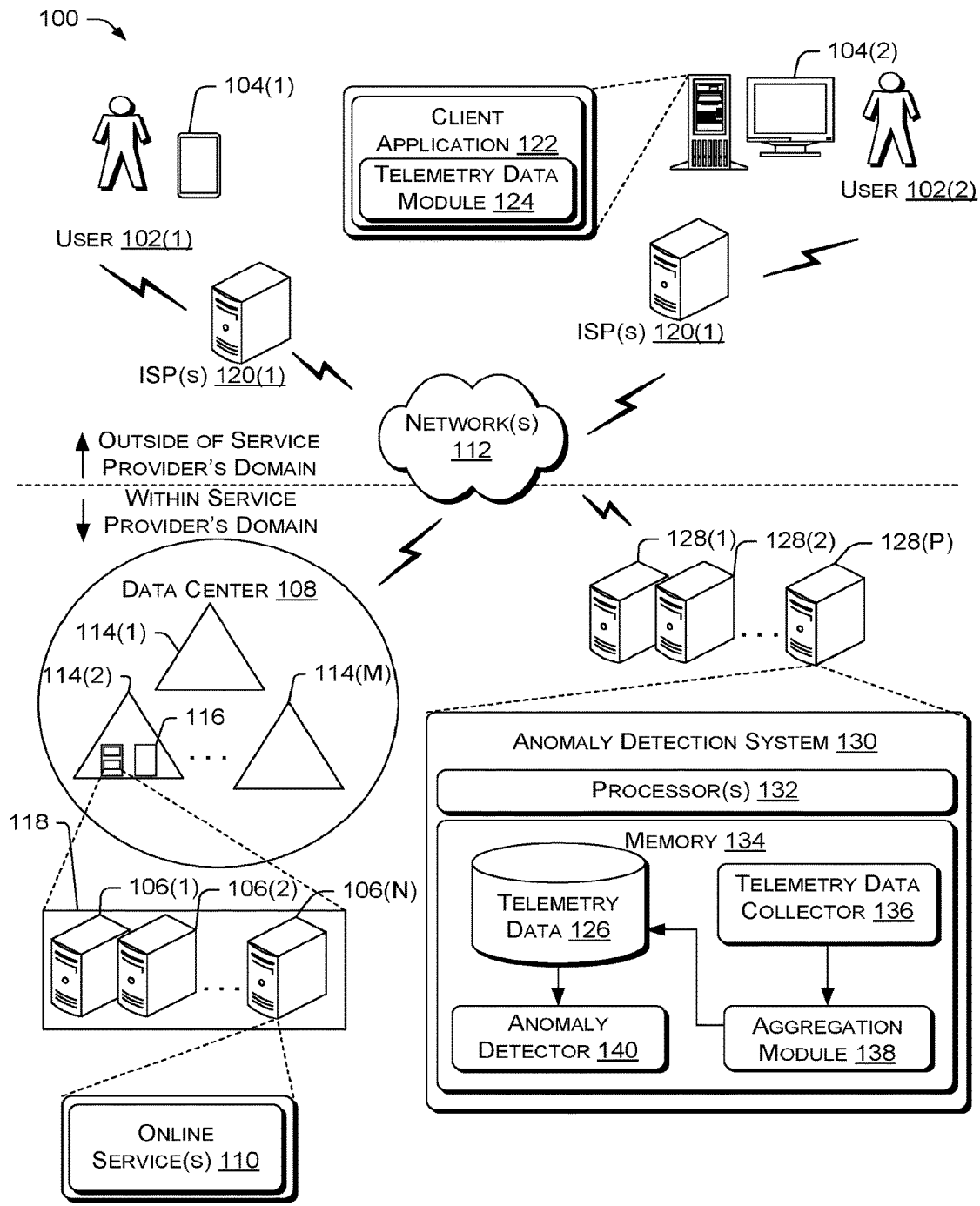
FIG. 1 illustrates an example environment for implementing an anomaly detection system for an online service that utilizes telemetry data.

FIG. 1 illustrates an example environment 100 for implementing an anomaly detection system for an online service that utilizes telemetry data. In the environment 100, a first user 102(1) and a second user 102(2) (collectively "users 102") represent a plurality of users 102 that can utilize respective client computing devices 104(1) and 104(2) (collectively "client computing devices 104") to access one or more servers 106(1), 106(2), . . . , 106(N) (collectively "server(s) 106") of a data center 108 that provides one or more online services 110. The online service(s) 110 can include, without limitation, a personal information management (PIM) service, such as an email service, a web-hosting service, a storage service, a virtual machine service, a business productivity service, an entertainment service (e.g., a music service, a video service, a gaming service, etc.), a personal productivity service (e.g., a travel service), a social networking service, or any similar cloud-based service.

The terms "users," "consumers," "customers," or "subscribers" can be used interchangeably herein to refer to the users 102, and one or more users 102 can subscribe to, or otherwise register for, access to one or more of the online service(s) 110 as a "tenant" of the online service(s) 110. In this regard, a tenant can comprise an individual user 102 or a group of multiple users 102, such as when an enterprise with hundreds of employees registers as a tenant of the online service(s) 110. Accordingly, the datacenter 108 can utilize a database or a similar data structure to manage registered tenants of the online service(s) 110, including management of access credentials for individual users 102.

The client computing devices 104 (sometimes referred to herein as "client devices 104") can be implemented as any number of computing devices, including, without limitation, a personal computer, a laptop computer, a desktop computer, a portable digital assistant (PDA), a mobile phone, tablet computer, an electronic book (eBook) reader device, a set-top box, a game console, a smart television, a wearable device (e.g., a smart watch, electronic "smart" glasses, a fitness tracker, etc.), or any other electronic device that can transmit/receive data over a network(s) 112. The network(s) 112 is representative of many different types of networks, and can include wired and/or wireless networks that enable communications between the various entities in the environment 100. In some configurations, the network(s) 112 can include cable networks, the Internet, local area networks (LANs), wide area networks (WAN), mobile telephone networks (MTNs), and other types of networks, possibly used in conjunction with one another, to facilitate communication between the server(s) 106 and the client devices 104. Although configurations are described in the context of a web based system, other types of client/server-based communications and associated application logic could be used.

The data center 108 can comprise a plurality of geographically-distributed server clusters, where a server cluster can comprise a subgrouping of the servers 106. In this manner, a vast number of customers 102 can access the online service(s) 110 from geographically disparate locations over the world. The various resources of the data center 108 can be structured in any suitable organizational framework so that the resources (e.g., tenants, individual server computers 106, etc.) can be tracked and managed. For example, tenants and servers 106 of the data center 108 can be organized into a plurality of forests 114(1), 114(2), . . . , 114(M) (collectively "forests 114"), wherein a forest 114 represents an active directory group for a group of tenants (or users 102) utilizing a subgroup of the servers 106. Tenants (or users 102) can be widely distributed in terms of geography. As an illustrative example, a set of first forests 114 can represent tenants and servers 106 in North America (i.e., a region), while a set of second forests 114 can represent other tenants and servers 106 in South America (i.e., another region), and so on. Regions can be defined at any level of granularity, such as continent, country, state, city, county, neighborhood, and so on. Within each forest 114 is a collection of sites 116, which represents lower level grouping of tenants and/or servers 106, and within each site 116 is a collection of database availability groups (DAGs) 118, and within each DAG 118 is a collection of the servers 116. For example, an individual DAG 118 can comprise approximately sixteen servers 116. By managing the data center 108 in such a hierarchical framework, the location of a problem that occurs with the online service(s) 110 can be more easily identified.

The environment 100 is further shown as including a first Internet service provider (ISP) 120(1) and a second ISP 120(2) (collectively "ISPs 120"). The ISPs 120 represent a plurality of ISPs 120 that can be involved in enabling access of users 102 to the online service(s) 110. That is, each ISP 120 can represent a third party entity (or operator) that provides services to users for accessing, using, or participating in the Internet, and although two ISPs 120(1) and 120(2) are shown in FIG. 1, it is to be appreciated that any number of ISPs 120 can be involved in the network topology on which the online service(s) 110 is implemented.

In some configurations, the first user 102(1) (or a tenant including multiple users 102) can pay the ISP 120(1) for Internet access so that the user 102(1) (or tenant) can utilize the online service(s) 110. Furthermore, each ISP 120 can pay an upstream ISP 120 for Internet access such that multiple ISPs 120 can be interposed between the client device 104(1) and a destination server 106 in some scenarios. In some configurations, the interconnection between ISPs 120 can be relatively complex and can be cascaded multiple times until reaching a "tier 1 carrier," and/or an ISP 120 can have more than one point of presence (PoP) with separate connections to an upstream ISP 120, and so on.

Because the third party ISPs 120 are not owned or controlled by the service provider of the online service(s) 110, the ISPs 120 are considered to be outside of the service provider's domain. The service provider 120 does not have the ability to locally monitor out-of-domain equipment, such as the networking equipment of the ISPs 120. However, the service provider of the online service(s) 110 can implement local active monitoring of its own data center 108, which is considered to be within the service provider's domain because the data center 108 is owned and controlled by the service provider of the online service(s) 110.

FIG. 1 shows that the client devices 104 are configured to execute a client application 122 that is configured to access the online service(s) 110 over the network 112. For example, the client application 122 can comprise an email client application 122 that is built into, or downloaded after manufacture to, the client device 104 and configured to access an email-based online service 110 to allow the user 102(2) to send and receive emails. Alternatively, the client application 112 can be a web browser that allows the client device 104 to access the online service(s) 110 in response to the user 102(2) entering a uniform resource locator (URL) in an address bar of the web browser.

In addition to connecting the client device 104 to the online service 110, the client application 122 can include a telemetry data module 124 that is configured to transmit telemetry data 126 to one or more servers 128(1), 128(2), . . . , 128(P) (collectively "server(s) 128") of an anomaly detection system 130. The anomaly detection system 130 can be owned and operated by the service provider of the online service 110, or by a third party entity that the service provider contracts with to analyze the telemetry data 126 and detect anomalies from the telemetry data 126 on behalf of the service provider of the online service 110.

In general, the telemetry data 126 comprises data that is generated as a result of the client application 122 accessing (connecting to, or disconnecting from) the online service(s) 110 and as a result of the user 102 using the online service(s) 110 via the client application 122. The telemetry data module 124 can cause the telemetry data 126 to be stored locally in local memory of the client device 104 and/or transmitted to the server(s) 128 periodically and/or in response to events or rules. For example, the telemetry data module 124 can store, in local storage, and/or transmit the telemetry data 126 every few (e.g., 5, 10, 15, etc.) minutes, or at any suitable time interval, as the online service(s) 110 is being accessed by the client application 122 and used by the user 102. As another example, a rule maintained by the client application 122 can specify that telemetry data 126 is to be stored locally and/or transmitted in response to an event, such as an event comprising a successful connection to the online service(s) 110, or an event comprising the generation of a particular error code indicative of a connection failure, and so on. Accordingly, the anomaly detection system 130 can receive telemetry data 126 originating from a plurality of client devices 104 as the client devices 104 are used to access the online service(s) 110 from various geographic locations.

The telemetry data 126 that is transmitted periodically and/or in response to an event or rule can comprise various types of data and various amounts of data, depending on the implementation. For example, the telemetry data 126 transmitted from an individual client device 104 can include, without limitation, a tenant identifier (e.g., a globally unique identifier (GUID) of the tenant), a user identifier, a machine identifier that identifies the client device 104 being used to connect to the online service(s), a machine type (e.g., a phone, a laptop, etc.) along with information relating to the build, the make, the model, etc., an Internet Protocol (IP) address from where the client device 104 is connecting to the online service(s) 110, logs of successful connections, logs of failed requests, logs of errors and error codes, network type information (e.g., wired network connection, wireless network connection, connected to a proxy, etc.), a server identifier of the last known server 106 to which the client device 104 was connected, a server identifier of the server 106 to which the client device 104 is currently connected, logs of user input commands received via a user interface of the client application 122, service connectivity data (e.g., login events, auto discover events, etc.), user feedback data (e.g., feedback about features of the online service(s) 110), a client configuration, logs of time periods the client device 122 took to respond to a user input event (longer time periods can be indicative of the client application 122 hanging or crashing), logs of time periods for server responses to client requests, logs of time periods for the following statuses: connected, disconnected, no network, needs password, get credentials, showing password prompt, showing certificate error, showing user interface, working offline, transient failures, version blocked presentation mode, trying to connect, failure lockout, or waiting, and so on. It is to be noted that the telemetry data 126 does not include personal or private information other than a user identifier, and that the collection of any data that is regarded as personal or private in nature is not collected without first obtaining the explicit consent of the user 102.

The server(s) 128 of the anomaly detection system 130, which can be arranged in a cluster or as a server farm, and across multiple fleets of servers 128, are shown as being equipped with one or more processors 132 and one or more forms of computer-readable memory 134. The processor(s) 132 can be configured to execute instructions, applications, or programs stored in the memory 134. In some configurations, the processor(s) 132 can include hardware processors that include, without limitation, a hardware central processing unit (CPU), a field programmable gate array (FPGA), a complex programmable logic device (CPLD), an application specific integrated circuit (ASIC), a system-on-chip (SoC), or a combination thereof.

Computer-readable media can include two types of computer-readable media, namely computer storage media and communication media. The memory 134 is an example of computer storage media. Computer storage media can include volatile and non-volatile, removable, and non-removable media implemented in any method or technology for storage of information, such as computer readable instructions, data structures, program modules, or other data. Computer storage media includes, but is not limited to, random access memory (RAM), read-only memory (ROM), erasable programmable read-only memory (EEPROM), flash memory or other memory technology, compact disc read-only memory (CD-ROM), DVD, or other optical storage, magnetic cassettes, magnetic tape, magnetic disk storage or other magnetic storage devices, or any other non-transmission medium that can be used to store the desired information and which can be accessed by the processor(s) 132. Any such computer storage media can be part of the server(s) 128. In general, computer storage media can include computer-executable instructions that, when executed by the processor(s) 132, perform various functions and/or operations described herein.

In contrast, communication media embody computer-readable instructions, data structures, program modules, or other data in a modulated data signal, such as a carrier wave, or other transmission mechanism. As defined herein, computer storage media does not include communication media.

The components included in the computer-readable memory 134 can include a telemetry data collector 136 configured to collect or otherwise receive telemetry data 126 from which anomalies relating to the online service(s) 110 are to be detected. The telemetry data collector 136 can be configured to receive the telemetry data 126 originating from a plurality of client devices 104 as the client devices 104 are used to access the online service(s) 110. The telemetry data 126 received by the telemetry data collector 136 can be maintained in one or more data stores of the anomaly detection system 130. Over time, a history of telemetry data 126 is obtained with time stamps corresponding to the time at which the telemetry data 126 was collected by, or transmitted from, the telemetry data module 124 of the client device 104.

In some configurations, the telemetry data 126 is classified into multiple classes of data so that a particular class of data can be pinpointed for detecting an anomaly with respect to the class of data. Furthermore, the classification of the telemetry data 126 can be hierarchically organized in that different class levels can be defined. For example, a high-level class of data can comprise "errors," and the class of data for "errors" can comprise multiple lower-level subclasses for each unique error code. Another high-level class can be defined for "tenants," and the class of data for "tenants" can comprise multiple lower-level subclasses for each unique tenant ID. Any similar class hierarchy can be defined, and any of the examples of telemetry data 126 described herein can be associated with an individual class and can be included in a higher level class and/or include lower level subclasses within its own class.

Furthermore, the raw telemetry data 126 can be converted (or translated) into a set of metrics (e.g., a count or a rate), as will be described in more detail below. For example, instances of a particular error code in the telemetry data 126 can be counted in order to generate counts of the particular error code. A class of data for the particular error code can additionally, or alternatively, be analyzed over time to generate rates of the particular error code as another type of metric. Any similar metric can be generated from the raw telemetry data 126 for a given class.

The computer-readable memory 134 can further include an aggregation module 138 that is configured to aggregate classes of data according to a component of interest in the system in which the online service(s) 110 is implemented. There are many components of interest that can be defined for the system implementing the online service(s) 110. For example, a component of interest can comprise an ISP 120 (or a group of ISPs 120), a particular server 106 (or a group of servers 106) of the data center 108, a particular DAG 118 (or a group of DAGs 118) of the data center 108, a particular site 116 (or a group of sites 116) of the data center 108, a particular forest 114 (or a group of forests 114) of the data center 108, the entire data center 108, a particular tenant (or a group of tenants), a particular user 102 (or a group of users 102), a particular service 110 (or a group of services) if there are multiple online services 110 provided by the service provider, a client application 122, a client configuration, and so on.

As an illustrative example, the aggregation module 138 can be configured to aggregate a count (i.e., a metric) of a particular error code (i.e., a class of data) according to the first ISP 120(1) (i.e., a component of interest), the first ISP 120(1) being outside of the domain of the service provider because the service provider does not own or control the equipment of the first ISP 120(1). This allows the service provider to monitor the operational state of the first ISP 120(1) by analyzing the count of the particular error code with respect to the first ISP 120(1) to see if there is an anomaly in the data. In an example scenario where multiple client devices 104 are reporting telemetry data 126 with abnormally high instances of the particular error code and/or abnormally high time periods showing the particular error code (as compared to a predicted count of the particular error code and/or a predicted time period in which the particular error code is expected to be shown), an anomaly can be detected. This detected anomaly can be used to infer that a problem has occurred with the first ISP 120(1) that is outside of the service provider's domain.

Accordingly, the computer-readable memory 134 can further include an anomaly detector 140 that is configured to detect anomalies relating to the online service(s) 110 using the telemetry data 126. In order to detect anomalies, the anomaly detector 140 generates a prediction of what is to be expected under normal conditions for a given class of data at a selected aggregate. The prediction comprises a time series of values that vary over time and is based on historical telemetry data 126. Continuing with the above example, for a class of data comprising error code "A" at the aggregate of the first ISP 120(1), the anomaly detector 140 can generate a prediction of a metric relating to the class of data for the selected aggregate by analyzing a subset of the telemetry data 126 collected over time in the past. For example, telemetry data 126 collected over the past month (or any suitable time period) can be analyzed with respect to error code "A" at the aggregate of the first ISP 120(1) to generate the prediction curve. In some configurations, the anomaly detector 140 is configured to compute a Fast Fourier Transform (FFT) over a history of the telemetry data 126 to generate a prediction curve comprising a time series of expected values. The prediction, like the actual data, fluctuates over time to reflect increasing values of a metric during peak hours of the day and decreasing value of the metric during night hours when a majority of the users 102 are asleep and not interacting with the online service(s) 110.

The anomaly detector 140 is further configured to determine a prediction error by comparing the prediction to the values of the aggregated metrics received from the aggregation module 138. In some configurations, the prediction error comprises a difference between the actual value of the metric obtained from real-time telemetry data 126 and the expected value of the metric from the prediction. If the difference (i.e., prediction error) is greater than a threshold difference at a particular time, this condition can be considered an anomaly. In some configurations, an anomaly is detected when the threshold difference is exceeded by the prediction error over a predetermined period of time (e.g., 30 minutes). In this manner, anomaly is detected if an anomalous condition persists for a predetermined period of time. It is to be appreciated that because the prediction generated is not an absolute threshold (i.e., a single numerical value), normal fluctuations in the metric are not mistaken for an anomaly. Use of an absolute threshold for the prediction is insufficient in this regard, as it would either detect anomalies where there is nothing wrong with the online service(s) 110 (i.e., generate too much noise), or not detect anomalies that should have been detected. Thus, the prediction generated by the anomaly detector 140 is more accurate than an absolute threshold prediction.

The class of data gives the anomaly detection system 130 information as to what the problem is (e.g., a problem relating to a particular error code), while the aggregate at which the anomaly is detected gives the anomaly detection system 130 information as to where the problem has occurred in terms of a component or node of the system that is used to implement the online service(s) 110. When an anomaly is detected, an alert can be generated and provisioned by the anomaly detection system 130 so that the service provider of the online service(s) 110 can take remedial action. For example, if an anomaly indicates a problem with the first ISP 120(1), an alert can be transmitted to personnel of the service provider that informs the personnel of the problem (based on the class of data), and provides information that allows the personnel to contact the ISP 120(1). In some configurations, automated recovery can be initiated in response to a detected anomaly. The eligibility of automated recovery can be conditioned on the type of anomaly detected. For example, automated recovery can be conditioned upon anomalies that are detected for components of the system within the service provider's domain, such as an anomaly that indicates there is a problem with a particular server 106 of the data center 108 operated by the service provider. In an example, an anomaly may have been detected as a result of a server 106 in the data center 108 having not been provisioned a software code patch that allows the server 106 to function properly. In this case, the fact that the server 106 is within the service provider's domain allows for automated recover to be initiated so that the updated patch is pushed to the non-functional server 106. Other automated recover mechanisms are possible, as will be described in more detail below.

Figure 2:
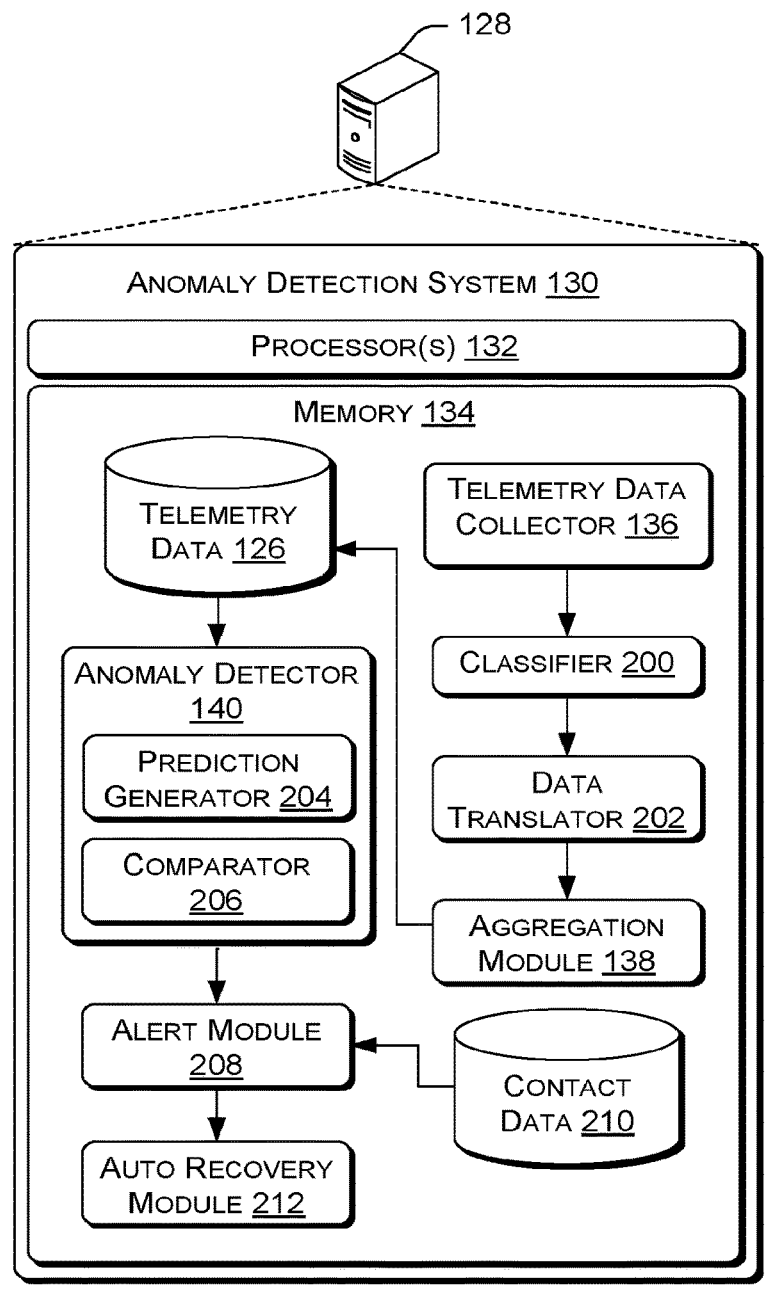
FIG. 2 is a schematic diagram of an example computer architecture of the anomaly detection system of FIG. 1.

FIG. 2 is a schematic diagram of an example computer architecture of the anomaly detection system 130 of FIG. 1. FIG. 2 shows an example server 128 equipped with processor(s) 132 and memory 134, as described with reference to FIG. 1. As the telemetry data collector 136 receives telemetry data 126 originating from a plurality of client devices 104 as a result of the client devices 104 accessing the online service(s) 110 over the network 112, the received telemetry data 126 is processed and stored in the memory 134. FIG. 2 illustrates, in more detail, how the telemetry data 126 can be processed and utilized for anomaly detection.

As shown in FIG. 2, the computer-readable memory 134 can further include a classifier 200 that is configured to classify the telemetry data 126 into multiple classes of data. As noted above, the telemetry data 126 originating from client devices 104 can include various types of data. An example type of telemetry data 126 includes error data, and each error can be identified by a specific error code. These error codes can be indicative of particular problems occurring with regard to the performance of the online service(s) 110 and/or problems inhibiting the ability of users 102 to connect to, or otherwise access, the online service(s) 110. For example, Messaging Application Programming Interface (MAPI) protocol can be used to connect to hypertext transfer protocol (HTTP) when using the online service(s) 110. If there is a failure to connect the MAPI protocol to HTTP, an error with a particular error code is generated. When such an error code is generated, the error code is included in the telemetry data 126 and the telemetry data 126 is transmitted to the telemetry data collector 136.

The classifier 200 can classify this error code into its own class. The class of data corresponding to the particular error code for a MAPI-to-HTTP failure to connect can be included within a broader class for "errors." Other classes can be defined for other types of errors, such as a 404 not found error, a 503 service not available error, a domain name system (DNS)-based error (e.g., DNS name resolution error), a "cannot resolve the host on local machine" error, an invalid server response error, a connection error, a certificate error, a time out error, a name not resolved error, a client request denied error, a server not reachable error, a signal dropped error, or any similar type of error. Furthermore, error codes can be grouped into broader classes that comprise a class of errors indicative of a problem occurring with an ISP 120 that is outside of the service provider's domain, or a class of errors indicative of a problem with a client configuration that is also outside of the service provider's domain, or a class of errors indicative of a problem with a group of servers 106 in the data center 108 within the service provider's domain, and so on.

In addition to errors, any other types of telemetry data 126 as described herein can be classified in a similar manner by the classifier 200. For example, a class of data can be defined for users 102, or tenants, while another class of data can be defined for machine identifiers, and another class of data can be defined for server identifiers, and another class of data can be defined for response times from servers 106 of the data center 108, and so on for any type of telemetry data 126.

The computer-readable memory 134 can further include a data translator 202 that is configured to translate or convert the raw telemetry data in to a set of metrics. For example, a first class of data corresponding to a domain name system (DNS) failure can be identified in the telemetry data 126, and this raw data can be counted in order to convert the raw data into a count (i.e., a metric) of the number of instances of DNS failures at a particular time. As another example, for a class of data corresponding to users 102, the raw user data can be converted to a count of users 102 accessing the online service(s) 110 at a particular time (e.g., by tracking ongoing user sessions). In addition to a "count" metric, the data translator 202 can generate other types of metrics such as rates, time durations, and so on. For example, a metric can be generated from data regarding response times from servers 106 of the data center 108 when the servers 106 are responding to requests from client devices 104. The logs of response times can be tallied (similar to counting) to convert the raw data into a metric corresponding to an amount of time a server 106 (or a group of servers 106) took to respond to pending client requests. Thus, the data translator 202 converts raw telemetry data for any given class of data into a set of metrics that is usable for detecting anomalies.

As noted above with respect to FIG. 1, the aggregation module 138 is configured to aggregate classes of data according to a component of interest in the system in which the online service(s) 110 is implemented. For example, a component of interest can comprise a particular ISP 120. In this manner, the anomaly detection system 130 can monitor metrics for a particular error type (i.e., a class of data) with respect to the particular ISP 120, or a count of users 102 (i.e., another class of data) accessing the online service(s) 110 via the particular ISP 120, and so on. These aggregated metrics can be stored and utilized to generate predictions.

In some configurations, a particular ISP 120 can be determined based at least in part on an Internet Protocol (IP) address identified in the received telemetry data 126. For example, a user 102 can access the online service(s) 110 using a client device 104 that reports a particular IP address in the telemetry data 126. In some configurations, the aggregation module 138 can perform a reverse lookup of the IP address identified in the telemetry data 126 to determine a particular ISP 120, such as the first ISP 120(1). This reverse lookup can be in the form of a reverse lookup query issued by the aggregation module 138 over the network 112.

FIG. 2 shows that the anomaly detector 140 can include a prediction generator 204. The prediction generator 204 is configured to access the stored aggregated metrics from the historical telemetry data 126 and analyze those metrics over past time windows to generate a prediction of what is to be expected under normal conditions based on historical trends. The prediction generator 204 can examine any suitable time window of the historical telemetry data 126, such as a month, two weeks, or any suitable time frame. The prediction generator 204 can also select a particular class of data (e.g., a particular error type, etc.) to be predicted at a given aggregate (e.g., a particular ISP 120).

In some configurations, the prediction generator 204 computes a FFT over the time window of historical telemetry data 126, wherein the historical telemetry data 126 includes a sequence of values of a metric for a class of data at a selected aggregate. This generates a prediction curve with values of a metric that vary over time in accordance with historical trends from historical telemetry data 126. The metric values can correspond to any of the classes of data described herein, such as metrics for different types of errors, metrics for users 102 accessing the online service(s) 110, and so on. The prediction fluctuates over time to model the historical trends where the metrics fluctuate depending on the time of day. Using FFT to generate the prediction provides a smooth pattern for any regularly repeating function that can be exhibited in the historical telemetry data 126. Although FFT is one example technique for generating the prediction, it is to be appreciated that the prediction can be generated by other techniques or algorithms, including a regression function, or a machine learning model/function, such as a logistic regression-based classification model, a tree-based model, a support vector machine (SVM), a kernel method, a neural network, a random forest, a spline (e.g., multivariate adaptive regression spline), a hidden Markov model (HMM), a Kalman filter (or enhanced Kalman filter), a Bayesian network (or Bayesian belief network), expectation maximization, a genetic algorithm, a linear regression algorithm, a nonlinear regression algorithm, or an ensemble of one or more of the aforementioned techniques.

Figure 3:
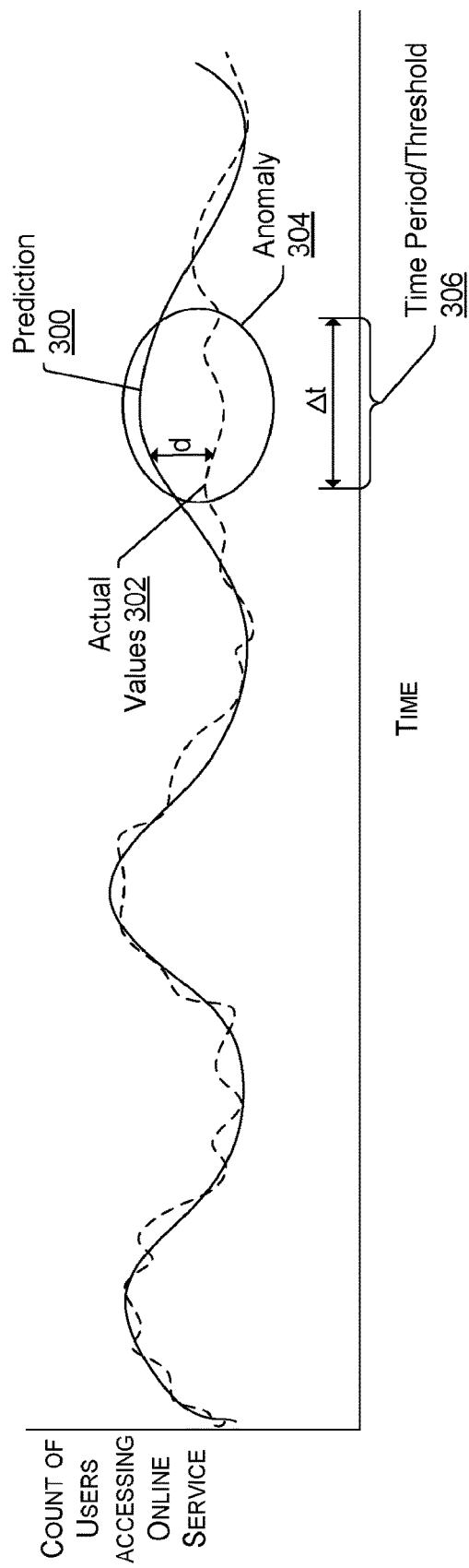
FIG. 3 illustrates an example graph of a prediction compared to actual values of aggregated metrics for a class of data.

Referring briefly to FIG. 3, an example graph illustrates actual values of aggregated metrics for a class of data plotted against a prediction. The prediction 300 is shown as a smooth curve that fluctuates over time. In some configurations, the prediction 300 is generated by computing a FFT over a time window of historical telemetry data 126.

The actual values 302 of aggregated metrics for a class of data are shown plotted against the prediction and represent a metric(s) of a class of data selected from telemetry data 126 received in real-time as the anomaly detection system 130 executes at runtime to detect anomalies. The example of FIG. 3 illustrates a scenario where the class of data corresponds to users 102 accessing the online service(s) 110, and this class of data is converted to a count of the users 102, which is an example metric that can be used to detect anomalies. This count metric is plotted over time, as shown in the graph of FIG. 3. Thus, the prediction 300 can be compared to the actual values 302 of user counts over time to detect an anomaly for a selected aggregate.

Returning to FIG. 2, the prediction generator 204 is configured to generate a prediction for each aggregate (or each component of interest) including components that are outside of the service provider's domain, like an ISP 120, or a group of ISPs 120. For example, a first prediction can be generated for a particular ISP 120, a second prediction can be generated for a group of ISPs 120, a third prediction can be generated for a particular DAG 118, and so on for any in-domain or out-of-domain component of the system implementing the online service(s) 110. Thus, the prediction 300 shown in FIG. 3 can be generated for a particular ISP 120 (or a group of ISPs 120), for example, which allows the anomaly detector 140 to monitor a set of user count metrics for the particular ISP 120 (or group of ISPs 120). Generating predictions for components that are outside of the service provider's domain enable the service provider of the online service(s) 110 to detect anomalies pertaining to components that are not under the service provider's control, but that the functional operation of the online service(s) 110 depends upon. In this manner, end-to-end monitoring of the online service(s) 110 can be enabled by generating predictions for the various components involved in the end-to-end network route of signals transmitted between the client device 104 and the server 106.

Furthermore a prediction can be generated for each class of data defined by the classifier 200. For example, a first prediction can be generated for a particular error type, a second prediction can be generated for a different error type, a third prediction can be generated for a type of client configuration, and so on. FIG. 3 shows an example where the prediction 300 is generated for the class of data corresponding to users 102 accessing the online service(s) 110. In this manner, predictions can be generated that are unique to a particular class of data at a selected aggregate so that the system 130 can monitor for anomalies for the particular class of data at the selected aggregate. Thus, a single class of data can have multiple predictions generated for the class of data at different aggregates, and a single aggregate can have multiple predictions generated for the aggregate for different classes of data.

With predictions generated, the anomaly detector 140 can utilize a comparator 206 to determine prediction errors for classes of data at selected aggregates. The comparator 206 can utilize prediction error thresholds to determine when a deviation between an actual value and the predicted value at a given time of day is to be considered an anomaly. Referring again to FIG. 3, an anomaly 304 is detected when a difference, d, exceeds a predefined prediction error threshold.

In some configurations, the comparator 206 can utilize a time threshold in addition to a prediction error threshold to detect an anomaly. For example, the anomaly 304 in FIG. 3 can be detected if a prediction error threshold is exceeded by the difference, d, over a series of data values that spans a time period 306, Δt (or threshold amount of time). FIG. 3 illustrates that the actual values 302 of the count of users 102 accessing the online service 110 deviates dramatically with respect to the prediction 300 at a start of the time period 306 and continues to deviate beyond a threshold prediction error for the extent of the time period 306, which is indicative of a persistent problem causing connectivity issues with the online service 110.

Returning to FIG. 2, if an anomaly is detected based on the techniques described herein, the detected anomaly causes an alert module 208 to generate an alert message. The alert message generated by the alert module 208 can be in the form of an email, a text, a push notification, a post to a website or an internal Intranet site of the service provider of the online service(s) 110, or any similar type of alert message. The alert message can identify the anomaly based on the class of data in question and/or the selected aggregate in question. For example, if the anomaly corresponds to a particular error code (i.e., a class of data), the alert message can include an identifier of the particular error code (e.g., the error code itself or another identifier) and/or a description of the error type. For instance, an error code that is indicative of an ISP 120 failure that is causing connection issues with the online service(s) 110 can be described as an "ISP failure" in the alert message, or any similar description. These descriptions can be predefined and stored in a database in association with the classes of data so that the descriptions can be retrieved via a lookup operation in the process of generating the alert message, and inserted into a template that forms the alert message. The alert message can further include an instruction to take an action, such as an instruction to contact the ISP 120 in question (i.e., the selected aggregate). In some configurations, the computer-readable memory 134 maintains a database of contact data 210 that can be referenced and used to insert contact information into the alert message template when the alert message is generated. For example, the contact information (e.g., phone number, email address, messaging alias, website address, etc.) of a particular ISP 120 can be retrieved from the contact data 210 database based on a lookup of the aggregate (or component of interest) in question. This contact information can be inserted into the alert message so that the recipient of the alert message can utilize the contact information to contact the relevant entity.

The computer-readable memory 134 can further include an automated recovery module 212 that is configured to initiate automatic recovery actions that are conditioned upon the aggregate (or component of interest) in question being within the service provider's domain. For example, the automated recovery module 212 can determine whether the component of interest pertaining to the detected anomaly (e.g., a particular server 106, group of servers 106, etc.) is within the service provider's domain, and if so, initiate an automatic recovery action. The automated recovery module 212 can reference a list of components in the service provider's domain, such as components of the data center 108 to determine if the component of interest matches any component in the list for making the determination of whether the component of interest is an in-domain component or an out-of-domain component.

Depending on the type of component for which the anomaly is detected, different automatic recovery actions can be initiated. For example, if the component of interest comprises a server 106 in the data center 108, the automatic recover action can comprise updating code of the server 106 with a code patch, rebooting the server 106, transitioning a plurality of user sessions from the server 106 to a different server 106 of the data center 108, or any similar automatic recover action that can be initiated to resolve the problem corresponding to the detected anomaly. If the component of interest comprises the online service 110 itself, the automatic recover action can comprise recycling (i.e., rebooting) the service 110, extending a subscription for a tenant of the online service 110, or any similar automatic recovery action.

The processes described herein are illustrated as a collection of blocks in a logical flow graph, which represent a sequence of operations that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the process. Moreover, in some configurations, one or more blocks of the processes can be omitted entirely.

Figure 4:
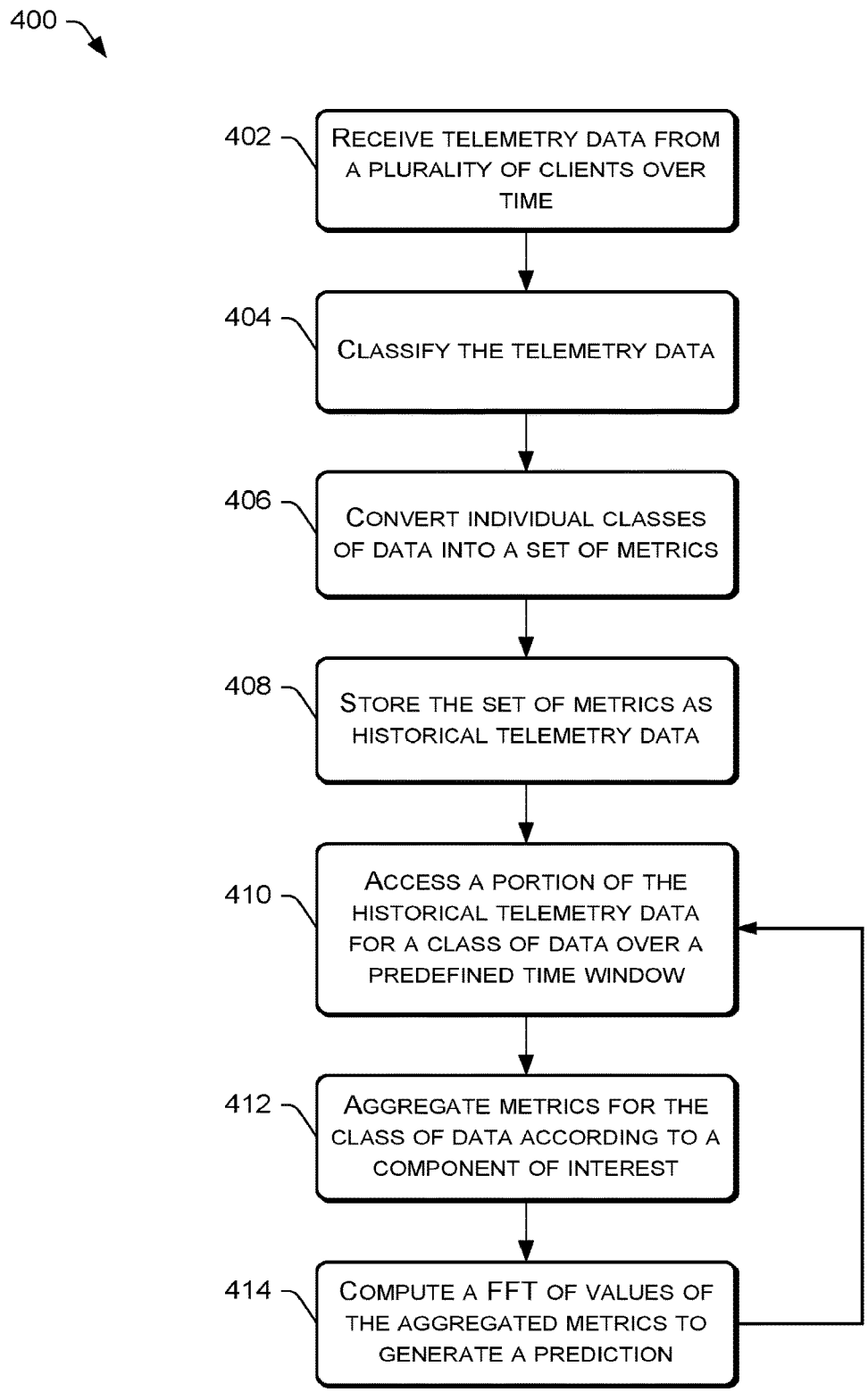
FIG. 4 is a flow diagram of an example process of generating a predictions for classes of data aggregated according to components of interest in a system implementing an online service.

FIG. 4 is a flow diagram of an example process 400 of generating a predictions for classes of data aggregated according to components of interest in a system implementing an online service 110. The process 400 is described with reference to the previous Figures. Particular reference may be made to the prediction generator 204 of FIG. 2.

At 402, telemetry data 126 originating from a plurality of client devices 104 is received over time. For example, as a result of client devices 104 executing respective client applications 122 to access an online service 110, telemetry data 126 is transmitted over the network 112 and received by the telemetry data collector 136.

At 404, the telemetry data 126 can be classified by the classifier 200. For example, subsets of the telemetry data 126 corresponding to error codes can be classified in a class of data for "errors," and individual error codes can be classified in a separate class.

At 406, the data translator 202 can convert the individual classes of data to a set of metrics. For example, a count or rate of an error code can be determined from the classified telemetry data 126, or a count of users 102 accessing the online service 110 at various times can be determined from the classified telemetry data 126.

At 408, the set of metrics for individual classes of data can be stored as historical telemetry data 126. Over time, as samples of telemetry data 126 are continuously received, processed, and stored, the historical telemetry data 126 comprises an extensive repository of processed telemetry data 126 that can be utilized for anomaly detection purposes.

At 410, the prediction generator 204 begins to generate a prediction for a particular class of data by accessing a portion of the historical telemetry data 126 for the class of data in question over a predefined time window. For example, historical telemetry data 126 for counts of a particular error code over the past month can be accessed at 410.

At 412, the prediction generator 204 can utilize the aggregation module 138 to aggregate the metrics for the class of data according to a component of interest. Continuing with the above example, counts of a particular error code over the past month can be aggregated by a particular ISP 120 that is used to connect users 102 to the data center 108 for access to the online service 110. In some configurations, an ISP 120 is determined by executing a reverse lookup of an IP address in the telemetry data 126.

At 414, the prediction generator 204 computes a FFT of values of the aggregated metrics for the class of data to generate a prediction of values that are to be expected under normal conditions. Continuing with the above example, the prediction generated at 414 can comprise a time series of expected counts of the particular error code over time for the particular ISP 120 (i.e., the component of interest by which the counts of the error code were aggregated). In this manner, the prediction resulting from the process 400 can be, for example, a prediction of the counts of the particular error code that are expected to occur for a particular ISP 120. The process 400 can iterate over steps 410-414 to generate additional predictions for different classes of data at various aggregates. For example, the process 400 can iterate over steps 410-414 to generate a prediction of the counts of the same error code for a different ISP 120. Additionally, or alternatively, another prediction can be generated for counts of users accessing the online service 110 via the same ISP 120 or a different ISP 120. In this manner, the process 400 can be utilized to generate multiple predictions for multiple unique combinations of classes of data and components of interest (i.e., aggregates).

Figure 5:
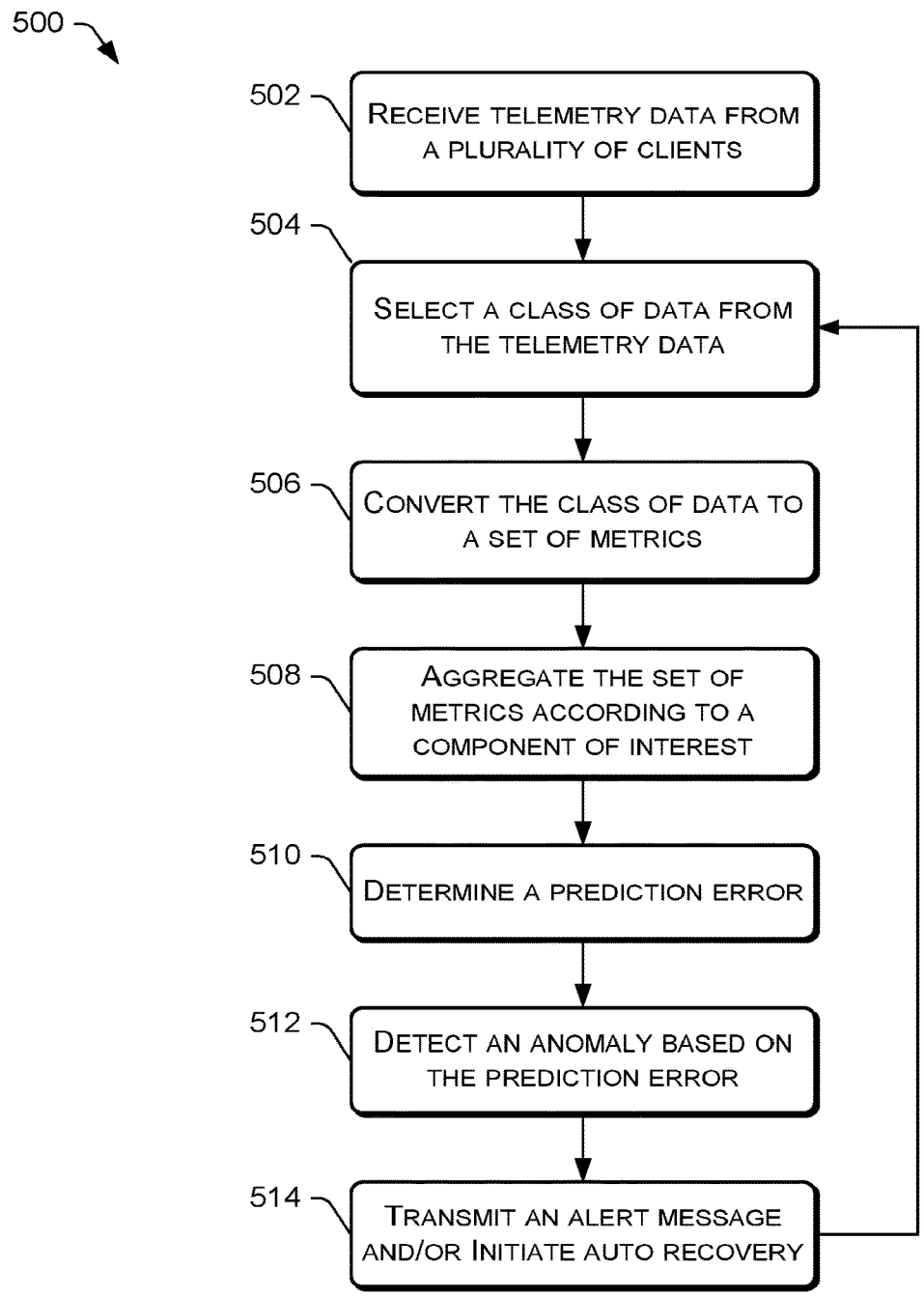
FIG. 5 is a flow diagram of an example process of automatically detecting an anomaly using telemetry data.

FIG. 5 is a flow diagram of an example process 500 of automatically detecting an anomaly using telemetry data 126. The process 500 is described with reference to the previous Figures. Particular reference may be made to the anomaly detector 140 and the comparator 206 of FIG. 2.

At 502, telemetry data 126 originating from a plurality of client devices 104 is received. For example, as a result of client devices 104 executing respective client applications 122 to access an online service 110, telemetry data 126 is transmitted over the network 112 and received by the telemetry data collector 136. In some configurations, the telemetry data 126 can be received at 502 for a particular sampling interval. Thus, the telemetry data 126 can represent real-time telemetry data 126 that originates at the client devices 104 and can be used for runtime anomaly detection.

At 504, a class of data is selected from the telemetry data 126 by the anomaly detector 140. For example, a class of data pertaining to an error code can be selected at 504. As another example, a class of data pertaining to response times from servers 106 of a data center 108 that implements an online service 110 can be selected at 504.

At 506, the class of data selected at 504 can be converted to a set of metrics. For example, the class of data pertaining to an error code can be converted to a count or a rate of the error code.

At 508, the set of metrics generated at 506 can be aggregated according to a component of interest in a system that implements the online service 110. For example, the component of interest can comprise a particular ISP 120, or the component of interest can comprise a group of servers 106, and so on, as described herein. The result of the aggregation at 508 is values of aggregated metrics over time for the component of interest. For example, counts of the particular error code can be aggregated over time for a particular ISP 120 at 508.

At 510, a prediction error is determined by comparing the values of the aggregated metrics from 508 to a prediction. The prediction can be generated by executing the example process 400 such that the prediction is based at least in part on historical telemetry data 126 pertaining to the class of data selected at 504 and the component of interest by which the metrics were aggregated at 508. In some configurations, the determination of the prediction error at 510 is made by determining a difference between an actual value of the metric obtained at 508 to an expected or inferred value from the prediction at a particular time.

At 512, the anomaly detector 140 detects an anomaly based at least in part on the prediction error. For example, the prediction error can be compared to a threshold prediction error to determine if an absolute value of the prediction error exceeds the threshold prediction error. In some configurations, a time threshold is utilized to determine if the condition of exceeding the threshold prediction error persists for at least a threshold time period, as illustrated in the example of FIG. 3, showing a persistent difference, d, between the prediction 300 and the actual values 302 for a threshold time period 306.

At 514, an alert message can be generated and transmitted based on the anomaly detected at 512. The alert message can be automatically generated using templates to insert predefined descriptions of the anomaly, the class of data in question, the component of interest, and/or an instruction to take remedial action, such as contacting a relevant entity that controls the component of interest. For example, an alert message can instruct a recipient (e.g., support personnel of the service provider) to contact a particular ISP 120, and can include a description of the anomaly or problem relating to the anomaly (e.g., failed equipment of the ISP 120, the type of error exhibited from the telemetry data 126, etc.). Additionally, or alternatively, at 514, an automatic recovery action can be initiated. The initiation of an automatic recovery action at 514 can include determining what automatic recovery action is appropriate for the situation. For example, the anomaly detection system 130 can maintain mappings of automatic recover actions to particular types of anomalies or classes of data. In this manner, a particular error code, for example, can be indicative of a particular type of problem with a server 106 in the data center 108, and a mapping to a corresponding automatic recovery action can be referenced and used by the automated recovery module 212 to initiate the appropriate automatic recovery action.

In some configurations, prior to initiating an automatic recovery action at 514, a determination can be made as to whether automatic recovery is possible. For example, automatic recovery actions can be conditioned upon the component of interest residing in the domain of the service provider of the online service 110. For example, the component of interest can be a server 106 or a group of servers 106 of the data center 108 that is owned and/or operated by the service provider, and therefore the service provider has the ability to initiate an automatic recovery action, such as sending an updated patch code to a server 106 with out-of-date software, rebooting a server 106, or transferring user sessions from a server 106 that is overloaded to another server 106 with more available capacity, and so on. If automatic recovery actions are possible, an automatic recovery action is initiated. If, on the other hand, automatic recovery actions are not possible, the system can transmit an alert message at 514. In some configurations, an alert message is transmitted and an automatic recovery action is initiated at 514.

The process 500 can iterate after 514 to select another class of data from the telemetry data 126 so that the process 500 can iterate over steps 504-514 to detect anomalies and take remedial action (e.g., transmit an alert message and/or initiate an automatic recovery action at 514) for different classes of data and/or different components of interest. In this manner, end-to-end monitoring of an online service(s) 110 can be implemented via the process 500.

The environment and individual elements described herein can of course include many other logical, programmatic, and physical components, of which those shown in the accompanying figures are merely examples that are related to the discussion herein.

The various techniques described herein are assumed in the given examples to be implemented in the general context of computer-executable instructions or software, such as program modules, that are stored in computer-readable storage and executed by the processor(s) of one or more computers or other devices such as those illustrated in the figures. Generally, program modules include routines, programs, objects, components, data structures, etc., and define operating logic for performing particular tasks or implement particular abstract data types.

Other architectures can be used to implement the described functionality, and are intended to be within the scope of this disclosure. Furthermore, although specific distributions of responsibilities are defined above for purposes of discussion, the various functions and responsibilities might be distributed and divided in different ways, depending on circumstances.

Similarly, software can be stored and distributed in various ways and using different means, and the particular software storage and execution configurations described above can be varied in many different ways. Thus, software implementing the techniques described above can be distributed on various types of computer-readable media, not limited to the forms of memory that are specifically described.

Example One

A computer-implemented method comprising: receiving telemetry data originating from a plurality of client devices, wherein the telemetry data was generated in response to the plurality of client devices accessing (e.g., connecting to, or disconnecting from, and/or receive of user input by a client application causing access by the client devices, etc.) an online service provided by a service provider; selecting a class of data (e.g., errors, error codes, users, tenants, machine identifiers, server identifiers, response times from servers of a data center, etc.) from the telemetry data; converting the class of data to a set of metrics (counts, rates, time durations, etc.); aggregating the set of metrics according to a component (e.g., an ISP(s), a server(s) of a data center, a DAG(s) of the data center, a site(s) of the data center, a forest(s) of the data center, the entire data center, a tenant(s), a user(s), a service(s), a client application, a client configuration, etc.) that is used to implement the online service; obtaining values of aggregated metrics over time for the component based at least in part on aggregating the set of metrics; determining a prediction error by comparing the values of the aggregated metrics to a prediction, the prediction being based at least in part on historical telemetry data pertaining to the class of data and the component; detecting an anomaly based at least in part on the prediction error; and transmitting an alert message of the anomaly.

Example Two

The method of Example One, further comprising initiating an automatic recovery action (e.g., updating code of a server in a data center with a code patch, rebooting the server, transitioning a plurality of user sessions from the server to a different server of the data center, recycling the online service, extending a subscription for a tenant of the online service, etc.) with respect to the component.

Example Three

The method of any of the previous examples, alone or in combination, further comprising determining that the component is an internet service provider (ISP) that is outside of a domain of the service provider.

Example Four

The method of any of the previous examples, alone or in combination, wherein aggregating the set of metrics comprises: determining the ISP from an Internet Protocol (IP) address in the telemetry data, the IP address corresponding to a subset of data in the class of data; and aggregating set of metrics for the subset of data in the class of data that corresponds to the IP address.

Example Five

The method of any of the previous examples, alone or in combination, wherein determining the ISP from the IP address comprises performing a reverse lookup of the ISP using the IP address.

Example Six

The method of any of the previous examples, alone or in combination, wherein the class of data corresponds to an error indicative of a problem with the ISP.

Example Seven

The method of any of the previous examples, alone or in combination, further comprising generating the prediction by computing a Fast Fourier Transform (FFT) on historical values pertaining to the class of data accessed from the historical telemetry data.

Example Eight

A system comprising: one or more processors (e.g., central processing unit (CPU), a field programmable gate array (FPGA), a complex programmable logic device (CPLD), an application specific integrated circuit (ASIC), a system-on-chip (SoC), etc.); and memory (e.g., RAM, ROM, EEPROM, flash memory, etc.) storing computer-executable instructions that, when executed by the one or more processors, perform operations comprising: receiving telemetry data originating from a plurality of client devices, wherein the telemetry data was generated in response to the plurality of client devices accessing (e.g., connecting to, or disconnecting from, and/or receive of user input by a client application causing access by the client devices, etc.) an online service provided by a service provider; selecting a class of data (e.g., errors, error codes, users, tenants, machine identifiers, server identifiers, response times from servers of a data center, etc.) from the telemetry data; converting the class of data to a set of metrics (counts, rates, time durations, etc.); aggregating the set of metrics according to a component (e.g., an ISP(s), a server(s) of a data center, a DAG(s) of the data center, a site(s) of the data center, a forest(s) of the data center, the entire data center, a tenant(s), a user(s), a service(s), a client application, a client configuration, etc.) that is used to implement the online service; obtaining values of aggregated metrics over time for the component based at least in part on aggregating the set of metrics; determining a prediction error by comparing the values of the aggregated metrics to a prediction, the prediction being based at least in part on historical telemetry data pertaining to the class of data and the component; detecting an anomaly based at least in part on the prediction error; and transmitting an alert message of the anomaly.

Example Nine

The system of Example Eight, the operations further comprising initiating an automatic recovery action (e.g., updating code of a server in a data center with a code patch, rebooting the server, transitioning a plurality of user sessions from the server to a different server of the data center, recycling the online service, extending a subscription for a tenant of the online service, etc.) with respect to the component.

Example Ten

The system of any of the previous examples, alone or in combination, the operations further comprising determining that the component is an internet service provider (ISP) that is outside of a domain of the service provider.

Example Eleven

The system of any of the previous examples, alone or in combination, wherein aggregating the set of metrics comprises: determining the ISP from an Internet Protocol (IP) address in the telemetry data, the IP address corresponding to a subset of data in the class of data; and aggregating set of metrics for the subset of data in the class of data that corresponds to the IP address.

Example Twelve

The system of any of the previous examples, alone or in combination, wherein determining the ISP from the IP address comprises performing a reverse lookup of the ISP using the IP address.

Example Thirteen

The system of any of the previous examples, alone or in combination, wherein the class of data corresponds to an error indicative of a problem with the ISP.

Example Fourteen

The system of any of the previous examples, alone or in combination, the operations further comprising generating the prediction by computing a Fast Fourier Transform (FFT) on historical values pertaining to the class of data accessed from the historical telemetry data.

Example Fifteen

One or more computer-readable storage media (e.g., RAM, ROM, EEPROM, flash memory, etc.) storing computer-executable instructions that, when executed by a processor (e.g., central processing unit (CPU), a field programmable gate array (FPGA), a complex programmable logic device (CPLD), an application specific integrated circuit (ASIC), a system-on-chip (SoC), etc.), perform operations comprising: receiving telemetry data originating from a plurality of client devices, wherein the telemetry data was generated in response to the plurality of client devices accessing (e.g., connecting to, or disconnecting from, and/or receive of user input by a client application causing access by the client devices, etc.) an online service provided by a service provider; selecting a class of data (e.g., errors, error codes, users, tenants, machine identifiers, server identifiers, response times from servers of a data center, etc.) from the telemetry data; converting the class of data to a set of metrics (counts, rates, time durations, etc.); aggregating the set of metrics according to a component (e.g., an ISP(s), a server(s) of a data center, a DAG(s) of the data center, a site(s) of the data center, a forest(s) of the data center, the entire data center, a tenant(s), a user(s), a service(s), a client application, a client configuration, etc.) that is used to implement the online service; obtaining values of aggregated metrics over time for the component based at least in part on aggregating the set of metrics; determining a prediction error by comparing the values of the aggregated metrics to a prediction, the prediction being based at least in part on historical telemetry data pertaining to the class of data and the component; detecting an anomaly based at least in part on the prediction error; and transmitting an alert message of the anomaly.

Example Sixteen

The one or more computer-readable storage media of Example Fifteen, the operations further comprising initiating an automatic recovery action (e.g., updating code of a server in a data center with a code patch, rebooting the server, transitioning a plurality of user sessions from the server to a different server of the data center, recycling the online service, extending a subscription for a tenant of the online service, etc.) with respect to the component.

Example Seventeen

The one or more computer-readable storage media of any of the previous examples, alone or in combination, the operations further comprising determining that the component is an internet service provider (ISP) that is outside of a domain of the service provider.

Example Eighteen

The one or more computer-readable storage media of any of the previous examples, alone or in combination, wherein aggregating the set of metrics comprises: determining the ISP from an Internet Protocol (IP) address in the telemetry data, the IP address corresponding to a subset of data in the class of data; and aggregating set of metrics for the subset of data in the class of data that corresponds to the IP address.

Example Nineteen

The one or more computer-readable storage media of any of the previous examples, alone or in combination, wherein determining the ISP from the IP address comprises performing a reverse lookup of the ISP using the IP address.

Example Twenty

The one or more computer-readable storage media of any of the previous examples, alone or in combination, wherein the class of data corresponds to an error indicative of a problem with the ISP.

Example Twenty-One

The one or more computer-readable storage media of any of the previous examples, alone or in combination, the operations further comprising generating the prediction by computing a Fast Fourier Transform (FFT) on historical values pertaining to the class of data accessed from the historical telemetry data.

Example Twenty-Two

A system comprising: one or more processors (e.g., central processing unit (CPU), a field programmable gate array (FPGA), a complex programmable logic device (CPLD), an application specific integrated circuit (ASIC), a system-on-chip (SoC), etc.); and memory (e.g., RAM, ROM, EEPROM, flash memory, etc.) storing computer-executable instructions that, when executed by the one or more processors, perform operations comprising: receiving telemetry data originating from a plurality of client devices; selecting a class of data (e.g., errors, error codes, users, tenants, machine identifiers, server identifiers, response times from servers of a data center, etc.) from the telemetry data; converting the class of data to a set of metrics (counts, rates, time durations, etc.); aggregating the set of metrics according to a component of interest (e.g., an ISP(s), a server(s) of a data center, a DAG(s) of the data center, a site(s) of the data center, a forest(s) of the data center, the entire data center, a tenant(s), a user(s), a service(s), a client application, a client configuration, etc.) to obtain values of aggregated metrics over time for the component of interest; determining a prediction error by comparing the values of the aggregated metrics to a prediction, the prediction being based at least in part on historical telemetry data pertaining to the class of data and the component of interest; detecting an anomaly based at least in part on the prediction error; and initiating an automatic recovery action (e.g., updating code of a server in a data center with a code patch, rebooting the server, transitioning a plurality of user sessions from the server to a different server of the data center, recycling the online service, extending a subscription for a tenant of the online service, etc.) with respect to the component of interest.

Example Twenty-Three

The system of Example Twenty-Two, the operations further comprising determining that the component of interest is within a domain of a service provider of an online service.

Example Twenty-Four

The system of any of the previous examples, alone or in combination, wherein: the component of interest comprises a server in a data center that implements the online service; and the automatic recovery action comprises at least one of updating code of the server with a code patch, rebooting the server, or transitioning a plurality of user sessions from the server to a different server of the data center.

Example Twenty-Five

The system of any of the previous examples, alone or in combination, wherein: the component of interest comprises the online service; and the automatic recovery action comprises at least one of recycling the online service, or extending a subscription for a tenant of the online service.

Example Twenty-Six

The system of any of the previous examples, alone or in combination, wherein: determining the prediction error comprises determining a difference between the prediction and the values of the aggregated metrics at a time of day; and detecting the anomaly comprises determining that the difference is greater than a threshold difference.

Example Twenty-Seven

The system of any of the previous examples, alone or in combination, wherein: determining the prediction error comprises determining a series of differences between the prediction and the values of the aggregated metrics over a period of time; and detecting the anomaly further comprises determining that the series of differences exceeds a threshold difference over the period of time.

Example Twenty-Eight

The system of any of the previous examples, alone or in combination, wherein: the class of data corresponds to users who access an online service; and the set of metrics corresponds to counts of the users who access the online service.

Example Twenty-Nine

The system of any of the previous examples, alone or in combination, the operations further comprising generating the prediction by computing a Fast Fourier Transform (FFT) on historical values pertaining to the class of data accessed from the historical telemetry data.

Example Thirty

A computer-implemented method comprising: receiving telemetry data originating from a plurality of client devices; selecting a class of data (e.g., errors, error codes, users, tenants, machine identifiers, server identifiers, response times from servers of a data center, etc.) from the telemetry data; converting the class of data to a set of metrics (counts, rates, time durations, etc.); aggregating the set of metrics according to a component of interest (e.g., an ISP(s), a server(s) of a data center, a DAG(s) of the data center, a site(s) of the data center, a forest(s) of the data center, the entire data center, a tenant(s), a user(s), a service(s), a client application, a client configuration, etc.) to obtain values of aggregated metrics over time for the component of interest; determining a prediction error by comparing the values of the aggregated metrics to a prediction, the prediction being based at least in part on historical telemetry data pertaining to the class of data and the component of interest; detecting an anomaly based at least in part on the prediction error; and initiating an automatic recovery action (e.g., updating code of a server in a data center with a code patch, rebooting the server, transitioning a plurality of user sessions from the server to a different server of the data center, recycling the online service, extending a subscription for a tenant of the online service, etc.) with respect to the component of interest.

Example Thirty-One

The computer-implemented method of Example Thirty, further comprising determining that the component of interest is within a domain of a service provider of an online service.

Example Thirty-Two

The computer-implemented method of any of the previous examples, alone or in combination, wherein: the component of interest comprises a server in a data center that implements the online service; and the automatic recovery action comprises at least one of updating code of the server with a code patch, rebooting the server, or transitioning a plurality of user sessions from the server to a different server of the data center.

Example Thirty-Three

The computer-implemented method of any of the previous examples, alone or in combination, wherein: the component of interest comprises the online service; and the automatic recovery action comprises at least one of recycling the online service, or extending a subscription for a tenant of the online service.

Example Thirty-Four

The computer-implemented method of any of the previous examples, alone or in combination, wherein: determining the prediction error comprises determining a difference between the prediction and the values of the aggregated metrics at a time of day; and detecting the anomaly comprises determining that the difference is greater than a threshold difference.

Example Thirty-Five

The computer-implemented method of any of the previous examples, alone or in combination, wherein: determining the prediction error comprises determining a series of differences between the prediction and the values of the aggregated metrics over a period of time; and detecting the anomaly further comprises determining that the series of differences exceeds a threshold difference over the period of time.

Example Thirty-Six

The computer-implemented method of any of the previous examples, alone or in combination, wherein: the class of data corresponds to users who access an online service; and the set of metrics corresponds to counts of the users who access the online service.

Example Thirty-Seven

The computer-implemented method of any of the previous examples, alone or in combination, further comprising generating the prediction by computing a Fast Fourier Transform (FFT) on historical values pertaining to the class of data accessed from the historical telemetry data.

Example Thirty-Eight

One or more computer-readable storage media (e.g., RAM, ROM, EEPROM, flash memory, etc.) storing computer-executable instructions that, when executed by a processor (e.g., central processing unit (CPU), a field programmable gate array (FPGA), a complex programmable logic device (CPLD), an application specific integrated circuit (ASIC), a system-on-chip (SoC), etc.), perform operations comprising: receiving telemetry data originating from a plurality of client devices; selecting a class of data (e.g., errors, error codes, users, tenants, machine identifiers, server identifiers, response times from servers of a data center, etc.) from the telemetry data; converting the class of data to a set of metrics (counts, rates, time durations, etc.); aggregating the set of metrics according to a component of interest (e.g., an ISP(s), a server(s) of a data center, a DAG(s) of the data center, a site(s) of the data center, a forest(s) of the data center, the entire data center, a tenant(s), a user(s), a service(s), a client application, a client configuration, etc.) to obtain values of aggregated metrics over time for the component of interest; determining a prediction error by comparing the values of the aggregated metrics to a prediction, the prediction being based at least in part on historical telemetry data pertaining to the class of data and the component of interest; detecting an anomaly based at least in part on the prediction error; and initiating an automatic recovery action (e.g., updating code of a server in a data center with a code patch, rebooting the server, transitioning a plurality of user sessions from the server to a different server of the data center, recycling the online service, extending a subscription for a tenant of the online service, etc.) with respect to the component of interest.

Example Thirty-Nine

The one or more computer-readable storage media of Example Thirty-Eight, the operations further comprising determining that the component of interest is within a domain of a service provider of an online service.

Example Forty

The one or more computer-readable storage media of any of the previous examples, alone or in combination, wherein: the component of interest comprises a server in a data center that implements the online service; and the automatic recovery action comprises at least one of updating code of the server with a code patch, rebooting the server, or transitioning a plurality of user sessions from the server to a different server of the data center.

Example Forty-One

The one or more computer-readable storage media of any of the previous examples, alone or in combination, wherein: the component of interest comprises the online service; and the automatic recovery action comprises at least one of recycling the online service, or extending a subscription for a tenant of the online service.

Example Forty-Two

The one or more computer-readable storage media of any of the previous examples, alone or in combination, wherein:

determining the prediction error comprises determining a difference between the prediction and the values of the aggregated metrics at a time of day; and detecting the anomaly comprises determining that the difference is greater than a threshold difference.

Example Forty-Three

The one or more computer-readable storage media of any of the previous examples, alone or in combination, wherein: determining the prediction error comprises determining a series of differences between the prediction and the values of the aggregated metrics over a period of time; and detecting the anomaly further comprises determining that the series of differences exceeds a threshold difference over the period of time.

Example Forty-Four

The one or more computer-readable storage media of any of the previous examples, alone or in combination, wherein: the class of data corresponds to users who access an online service; and the set of metrics corresponds to counts of the users who access the online service.

Example Forty-Five

The one or more computer-readable storage media of any of the previous examples, alone or in combination, the operations further comprising generating the prediction by computing a Fast Fourier Transform (FFT) on historical values pertaining to the class of data accessed from the historical telemetry data.

Example Forty-Six

One or more computer-readable storage media (e.g., RAM, ROM, EEPROM, flash memory, etc.) storing computer-executable instructions that, when executed by a processor (e.g., central processing unit (CPU), a field programmable gate array (FPGA), a complex programmable logic device (CPLD), an application specific integrated circuit (ASIC), a system-on-chip (SoC), etc.), perform operations comprising: receiving telemetry data originating from a plurality of client devices; selecting a class of data (e.g., errors, error codes, users, tenants, machine identifiers, server identifiers, response times from servers of a data center, etc.) from the telemetry data; converting the class of data to a set of metrics (counts, rates, time durations, etc.); aggregating the set of metrics according to a component of interest (e.g., an ISP(s), a server(s) of a data center, a DAG(s) of the data center, a site(s) of the data center, a forest(s) of the data center, the entire data center, a tenant(s), a user(s), a service(s), a client application, a client configuration, etc.) to obtain values of aggregated metrics over time for the component of interest; determining a prediction error by comparing the values of the aggregated metrics to a prediction, the prediction being based at least in part on historical telemetry data pertaining to the class of data and the component of interest; detecting an anomaly based at least in part on the prediction error; and transmitting an alert message of the anomaly.

Example Forty-Seven

The one or more computer-readable storage media of Example Forty-Six, wherein: the component of interest comprises an internet service provider (ISP) that enables the plurality of client devices to access to an online service; and the ISP is outside of a domain of a service provider of the online service.

Example Forty-Eight

The one or more computer-readable storage media of any of the previous examples, alone or in combination, wherein: the class of data corresponds to an error indicative of a problem with the ISP.

Example Forty-Nine

The one or more computer-readable storage media of any of the previous examples, alone or in combination, wherein the alert message includes an identification of the error and contact information of the ISP.

Example Fifty

The one or more computer-readable storage media of any of the previous examples, alone or in combination, the operations further comprising generating the prediction by computing a Fast Fourier Transform (FFT) on historical values pertaining to the class of data accessed from the historical telemetry data.

Example Fifty-One

A system comprising: one or more processors (e.g., central processing unit (CPU), a field programmable gate array (FPGA), a complex programmable logic device (CPLD), an application specific integrated circuit (ASIC), a system-on-chip (SoC), etc.); and memory (e.g., RAM, ROM, EEPROM, flash memory, etc.) storing computer-executable instructions that, when executed by the one or more processors, perform operations comprising: receiving telemetry data originating from a plurality of client devices; selecting a class of data (e.g., errors, error codes, users, tenants, machine identifiers, server identifiers, response times from servers of a data center, etc.) from the telemetry data; converting the class of data to a set of metrics (counts, rates, time durations, etc.); aggregating the set of metrics according to a component of interest (e.g., an ISP(s), a server(s) of a data center, a DAG(s) of the data center, a site(s) of the data center, a forest(s) of the data center, the entire data center, a tenant(s), a user(s), a service(s), a client application, a client configuration, etc.) to obtain values of aggregated metrics over time for the component of interest; determining a prediction error by comparing the values of the aggregated metrics to a prediction, the prediction being based at least in part on historical telemetry data pertaining to the class of data and the component of interest; detecting an anomaly based at least in part on the prediction error; and transmitting an alert message of the anomaly.

Example Fifty-Two

The system of Example Fifty-One, wherein: the component of interest comprises an internet service provider (ISP) that enables the plurality of client devices to access to an online service; and the ISP is outside of a domain of a service provider of the online service.

Example Fifty-Three

The system of any of the previous examples, alone or in combination, wherein the class of data corresponds to an error indicative of a problem with the ISP.

Example Fifty-Four

The system of any of the previous examples, alone or in combination, wherein the alert message includes an identification of the error and contact information of the ISP.

Example Fifty-Five

The system of any of the previous examples, alone or in combination, the operations further comprising generating the prediction by computing a Fast Fourier Transform (FFT) on historical values pertaining to the class of data accessed from the historical telemetry data.

Example Fifty-Six

A computer-implemented method comprising: receiving telemetry data originating from a plurality of client devices; selecting a class of data (e.g., errors, error codes, users, tenants, machine identifiers, server identifiers, response times from servers of a data center, etc.) from the telemetry data; converting the class of data to a set of metrics (counts, rates, time durations, etc.); aggregating the set of metrics according to a component of interest (e.g., an ISP(s), a server(s) of a data center, a DAG(s) of the data center, a site(s) of the data center, a forest(s) of the data center, the entire data center, a tenant(s), a user(s), a service(s), a client application, a client configuration, etc.) to obtain values of aggregated metrics over time for the component of interest; determining a prediction error by comparing the values of the aggregated metrics to a prediction, the prediction being based at least in part on historical telemetry data pertaining to the class of data and the component of interest; detecting an anomaly based at least in part on the prediction error; and transmitting an alert message of the anomaly.

Example Fifty-Seven

The computer-implemented method of Example Fifty-Six, wherein: the component of interest comprises an internet service provider (ISP) that enables the plurality of client devices to access to an online service; and the ISP is outside of a domain of a service provider of the online service.

Example Fifty-Eight

The computer-implemented method of any of the previous examples, alone or in combination, wherein the class of data corresponds to an error indicative of a problem with the ISP.

Example Fifty-Nine

The computer-implemented method of any of the previous examples, alone or in combination, wherein the alert message includes an identification of the error and contact information of the ISP.

Example Sixty

The computer-implemented method of any of the previous examples, alone or in combination, further comprising generating the prediction by computing a Fast Fourier Transform (FFT) on historical values pertaining to the class of data accessed from the historical telemetry data.

Example Sixty-One

A system comprising: means for executing computer-executable instructions (e.g., central processing unit (CPU), a field programmable gate array (FPGA), a complex programmable logic device (CPLD), an application specific integrated circuit (ASIC), a system-on-chip (SoC), etc.); and means for storing (e.g., RAM, ROM, EEPROM, flash memory, etc.) computer-executable instructions that, when executed by the means for executing computer-executable instructions, perform operations comprising: receiving telemetry data originating from a plurality of client devices; selecting a class of data (e.g., errors, error codes, users, tenants, machine identifiers, server identifiers, response times from servers of a data center, etc.) from the telemetry data; converting the class of data to a set of metrics (counts, rates, time durations, etc.); aggregating the set of metrics according to a component of interest (e.g., an ISP(s), a server(s) of a data center, a DAG(s) of the data center, a site(s) of the data center, a forest(s) of the data center, the entire data center, a tenant(s), a user(s), a service(s), a client application, a client configuration, etc.) to obtain values of aggregated metrics over time for the component of interest; determining a prediction error by comparing the values of the aggregated metrics to a prediction, the prediction being based at least in part on historical telemetry data pertaining to the class of data and the component of interest; detecting an anomaly based at least in part on the prediction error; and initiating an automatic recovery action (e.g., updating code of a server in a data center with a code patch, rebooting the server, transitioning a plurality of user sessions from the server to a different server of the data center, recycling the online service, extending a subscription for a tenant of the online service, etc.) with respect to the component of interest.

Example Sixty-Two

A system comprising: means for executing computer-executable instructions (e.g., central processing unit (CPU), a field programmable gate array (FPGA), a complex programmable logic device (CPLD), an application specific integrated circuit (ASIC), a system-on-chip (SoC), etc.); and means for storing (e.g., RAM, ROM, EEPROM, flash memory, etc.) computer-executable instructions that, when executed by the means for executing computer-executable instructions, perform operations comprising: receiving telemetry data originating from a plurality of client devices; selecting a class of data (e.g., errors, error codes, users, tenants, machine identifiers, server identifiers, response times from servers of a data center, etc.) from the telemetry data; converting the class of data to a set of metrics (counts, rates, time durations, etc.); aggregating the set of metrics according to a component of interest (e.g., an ISP(s), a server(s) of a data center, a DAG(s) of the data center, a site(s) of the data center, a forest(s) of the data center, the entire data center, a tenant(s), a user(s), a service(s), a client application, a client configuration, etc.) to obtain values of aggregated metrics over time for the component of interest; determining a prediction error by comparing the values of the aggregated metrics to a prediction, the prediction being based at least in part on historical telemetry data pertaining to the class of data and the component of interest; detecting an anomaly based at least in part on the prediction error; and transmitting an alert message of the anomaly.

Example Sixty-Three

A system comprising: means for executing computer-executable instructions (e.g., central processing unit (CPU), a field programmable gate array (FPGA), a complex programmable logic device (CPLD), an application specific integrated circuit (ASIC), a system-on-chip (SoC), etc.); and means for storing (e.g., RAM, ROM, EEPROM, flash memory, etc.) computer-executable instructions that, when executed by the means for executing computer-executable instructions, perform operations comprising: receiving telemetry data originating from a plurality of client devices, wherein the telemetry data was generated in response to the plurality of client devices accessing (e.g., connecting to, or disconnecting from, and/or receive of user input by a client application causing access by the client devices, etc.) an online service provided by a service provider; selecting a class of data (e.g., errors, error codes, users, tenants, machine identifiers, server identifiers, response times from servers of a data center, etc.) from the telemetry data; converting the class of data to a set of metrics (counts, rates, time durations, etc.); aggregating the set of metrics according to a component (e.g., an ISP(s), a server(s) of a data center, a DAG(s) of the data center, a site(s) of the data center, a forest(s) of the data center, the entire data center, a tenant(s), a user(s), a service(s), a client application, a client configuration, etc.) that is used to implement the online service; obtaining values of aggregated metrics over time for the component based at least in part on aggregating the set of metrics; determining a prediction error by comparing the values of the aggregated metrics to a prediction, the prediction being based at least in part on historical telemetry data pertaining to the class of data and the component; detecting an anomaly based at least in part on the prediction error; and transmitting an alert message of the anomaly.

CONCLUSION

In closing, although the various configurations have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter.

What is claimed is:

1. One or more computer-readable storage media storing instructions that, when executed by one or more processors, perform operations comprising:
   receiving telemetry data originating from a plurality of client devices;
   converting a class of data from the telemetry data to a set of metrics;
   aggregating the set of metrics according to a component of interest to obtain values of aggregated metrics over time for the component of interest;
   determining a prediction error by comparing the values of the aggregated metrics to a prediction, the prediction being based at least in part on historical telemetry data pertaining to the class of data and the component of interest;
   detecting an anomaly based at least in part on the prediction error; and
   transmitting an alert message of the anomaly.

2. The one or more computer-readable storage media of claim 1, wherein: the component of interest comprises an internet service provider (ISP) that enables the plurality of client devices to access to an online service; and the ISP is outside of a domain of a service provider of the online service.

3. The computer-readable storage media of claim 2, wherein the class of data corresponds to an error indicative of a problem with the ISP.

4. The computer-readable storage media of claim 3, wherein the alert message includes an identification of the error and contact information of the ISP.

5. The computer-readable storage media of claim 1, the operations further comprising generating the prediction by computing a Fast Fourier Transform (FFT) on historical values pertaining to the class of data accessed from the historical telemetry data.

6. A computer-implemented method comprising:
   receiving telemetry data originating from a plurality of client devices, wherein the telemetry data was generated in response to the plurality of client devices accessing an online service provided by a service provider;
   generating a set of metrics based on the telemetry data;
   aggregating the set of metrics according to a component that is used to implement the online service;
   obtaining values of aggregated metrics over time for the component based at least in part on aggregating the set of metrics;
   determining a prediction error by comparing the values of the aggregated metrics to a prediction, the prediction being based at least in part on historical telemetry data pertaining to the component;
   detecting an anomaly based at least in part on the prediction error; and
   transmitting an alert message of the anomaly.

7. The computer-implemented method of claim 6, further comprising initiating an automatic recovery action with respect to the component.

8. The computer-implemented method of claim 6, further comprising determining that the component is an internet service provider (ISP) that is outside of a domain of the service provider.

9. The computer-implemented method of claim 6, wherein generating the set of metrics based on the telemetry data includes converting a class of data from the telemetry data to the set of metrics.

10. The computer-implemented method of claim 9, wherein aggregating the set of metrics comprises: determining the ISP from an Internet Protocol (IP) address in the telemetry data, the IP address corresponding to a subset of data in the class of data; and aggregating the set of metrics for the subset of data in the class of data that corresponds to the IP address.

11. The computer-implemented method of claim 9, wherein the class of data corresponds to an error indicative of a problem with the ISP.

12. The computer-implemented method of claim 9, further comprising generating the prediction by computing a Fast Fourier Transform (FFT) on historical values pertaining to the class of data accessed from the historical telemetry data.

13. A system comprising:
one or more processors;
memory storing computer-executable instructions that, when executed by the one or more processors, cause the one or more processors to perform operations comprising:
    receiving telemetry data originating from a plurality of client devices;
    generating a set of metrics based on the telemetry data;
    aggregating the set of metrics according to a component of interest to obtain values of aggregated metrics over time for the component of interest;
    determining a prediction error by comparing the values of the aggregated metrics to a prediction, the prediction being based at least in part on historical telemetry data pertaining to the component of interest;
    detecting an anomaly based at least in part on the prediction error; and
    initiating an automatic recovery action with respect to the component of interest.

14. The system of claim 13, the operations further comprising determining that the component of interest is within a domain of a service provider of an online service.

15. The system of claim 14, wherein: the component of interest comprises a server in a data center that implements the online service; and the automatic recovery action comprises at least one of updating code of the server with a code patch, rebooting the server, or transitioning a plurality of user sessions from the server to a different server of the data center.

16. The system of claim 14, wherein: the component of interest comprises the online service; and the automatic recovery action comprises at least one of recycling the online service, or extending a subscription for a tenant of the online service.

17. The system of claim 14, wherein: determining the prediction error comprises determining a difference between the prediction and the values of the aggregated metrics at a time of day; and detecting the anomaly comprises determining that the difference is greater than a threshold difference.

18. The system of claim 14, wherein: determining the prediction error comprises determining a series of differences between the prediction and the values of the aggregated metrics over a period of time; and detecting the anomaly further comprises determining that the series of differences exceeds a threshold difference over the period of time.

19. The system of claim 14, wherein: the telemetry data corresponds to users who access an online service; and the set of metrics corresponds to counts of the users who access the online service.

20. The system of claim 14, the operations further comprising generating the prediction by computing a Fast Fourier Transform (FFT) based on the historical telemetry data.

* * * * *